(12) United States Patent
Zhong et al.

(10) Patent No.: US 12,290,964 B2
(45) Date of Patent: May 6, 2025

(54) 3D-CONFIGURED PRODUCTION STRUCTURE OF RUBBER PRODUCTS BASED ON INTELLIGENT MANUFACTURING UNIT AND PRODUCTION METHOD OF SAME

(71) Applicant: CHENGDU HOLY AVIATION SCIENCE TECHNOLOGY CO., LTD., Chengdu (CN)

(72) Inventors: Jie Zhong, Chengdu (CN); Aimin Zeng, Chengdu (CN); Xiaofeng Zhang, Chengdu (CN); Liang Wang, Chengdu (CN); Xuegang Wu, Chengdu (CN); Qun Zhou, Chengdu (CN); Zanping Zhang, Chengdu (CN); Chen Han, Chengdu (CN); Yu Liu, Chengdu (CN); Zhipeng Li, Chengdu (CN); Gaosheng Guo, Chengdu (CN); Rongqian Mo, Chengdu (CN); Yue Fei, Chengdu (CN)

(73) Assignee: CHENGDU HOLY AVIATION SCIENCE TECHNOLOGY CO., LTD., Chengdu (CN)

( * ) Notice: Subject to any disclaimer, the term of this patent is extended or adjusted under 35 U.S.C. 154(b) by 0 days.

(21) Appl. No.: 17/897,106

(22) Filed: Aug. 26, 2022

(65) Prior Publication Data
US 2023/0278262 A1    Sep. 7, 2023

(30) Foreign Application Priority Data
Mar. 7, 2022 (CN) .......................... 202210215992.4

(51) Int. Cl.
*B29C 31/08* (2006.01)
*B29C 33/24* (2006.01)
(Continued)

(52) U.S. Cl.
CPC .............. *B29C 31/08* (2013.01); *B29C 33/24* (2013.01); *B29C 35/041* (2013.01); *B29C 2037/903* (2013.01); *B29K 2021/00* (2013.01)

(58) Field of Classification Search
CPC ....... B29C 31/08; B29C 33/24; B29C 35/041; B29C 2037/903; B29K 2021/00
See application file for complete search history.

(56) References Cited

U.S. PATENT DOCUMENTS

| | | | |
|---|---|---|---|
| 4,035,265 A * | 7/1977 | Saunders | H01B 1/18 252/511 |
| 5,178,885 A * | 1/1993 | Vallier | B29C 33/0038 249/161 |

(Continued)

*Primary Examiner* — Jacob T Minskey
*Assistant Examiner* — Elisa H Vera
(74) *Attorney, Agent, or Firm* — MUNCY, GEISSLER, OLDS & LOWE, P.C.

(57) ABSTRACT

A 3D-configured production structure of rubber products based on an intelligent manufacturing unit and a production method thereof. The structure includes a stereoscopic production warehouse used to store a mobile intelligent manufacturing unit and an ex-warehouse delivery system used to deliver the mobile intelligent manufacturing unit. The mobile intelligent manufacturing unit includes a unit functional assembly, a molding vulcanization apparatus, a blank feeder, a material-delivering apparatus, a product-collecting apparatus and a reclaimer. The molding vulcanization apparatus includes a upper heat plate, a upper mold, a lower mold, a lower heat plate and a support post. The upper mold and the lower mold are arranged on the inner sides of the upper heat plate and the lower heat plate, respectively. The upper heat plate is fixed on one end of the support post, and the lower heat plate is arranged through the support post.

9 Claims, 8 Drawing Sheets

(51) Int. Cl.
  *B29C 35/04*     (2006.01)
  *B29C 37/00*     (2006.01)
  *B29K 21/00*     (2006.01)

(56) References Cited

U.S. PATENT DOCUMENTS

| | | | | |
|---|---|---|---|---|
| 5,271,727 | A * | 12/1993 | Irie | B29C 31/006 |
| | | | | 425/38 |
| 6,582,212 | B1 * | 6/2003 | Mitamura | B29D 30/005 |
| | | | | 425/38 |
| 2001/0048182 | A1 * | 12/2001 | Caretta | B22F 5/007 |
| | | | | 264/501 |
| 2003/0079819 | A1 * | 5/2003 | Abare | B29C 65/78 |
| | | | | 156/64 |
| 2012/0031866 | A1 * | 2/2012 | Trover | A47B 96/02 |
| | | | | 29/897.3 |
| 2020/0025303 | A1 * | 1/2020 | Durbin | F16K 31/047 |

\* cited by examiner

3D-CONFIGURED PRODUCTION STRUCTURE OF RUBBER PRODUCTS BASED ON INTELLIGENT MANUFACTURING UNIT AND PRODUCTION METHOD OF SAME

FIELD OF THE INVENTION

Background of the Invention

Molding vulcanization of rubber products is a rubber production process and method that a rubber blank is placed in a vulcanization mold and a temperature and pressure environment required by the process is provided and lasts for a specified time to improve comprehensive performance, so the molding vulcanization process is required to be applied in most of the rubber products. In order to increase the production capacity, this industry generally adopts the method of increasing the vulcanization mold cavity, which is required to add a cavity inside the mold, but resulting in more complicated structure of the mold and larger overall volume of the mold, and the processing cost has also increased. Therefore, considering the cost and complexity of the mold, this method does not have high automation and flexibility.

SUMMARY OF THE INVENTION

In order to achieve the above object, the present invention provides the following technical solutions:

A 3D-configured production structure of rubber products based on an intelligent manufacturing unit, comprising:
- a stereoscopic production warehouse used to store a mobile intelligent manufacturing unit,
- and an ex-warehouse delivery system used to deliver the mobile intelligent manufacturing unit;
- wherein the mobile intelligent manufacturing unit includes a unit functional assembly, a molding vulcanization apparatus, a blank feeder, a material-delivering apparatus, a product-collecting apparatus and a reclaimer, the molding vulcanization apparatus includes a upper heat plate, a upper mold, a lower mold, a lower heat plate and a support post, the upper mold and the lower mold are arranged on the inner sides of the upper heat plate and the lower heat plate, respectively, the upper heat plate is fixed on one end of the support post, the lower heat plate is arranged through the support post, a fixing plate is also arranged inside the support post, a vulcanization cylinder is fixed on the lower side of the fixing plate, the output end of the vulcanization cylinder is connected and fixed to the lower heat plate by the fixing plate.

Further, the unit functional assembly includes a unit housing, in which a PLC controller, an air compressor and a communication module are arranged, and on which a positioning hole and a power hole are opened, and one side of the unit housing is a detachable housing cover.

Further, the middle of the upper heat plate is provided with a heat pipe used to provide heat and an air hole channel used to provide force to adsorb a mold.

Further, the blank feeder includes a blank sliding platform driven by a first motor, a first sliding block is slidably arranged on the blank sliding platform, a box-groove base is fixed on the first sliding block, a plurality of box grooves are formed inside the box-groove base, a blank box is placed in the box groove, and a first RFID chip is arranged inside the blank box.

Further, the blank box includes a blank box case, the open end of which is fixed with a magnetic cover, and in which a blank box inner post is arranged, a tubular inner cavity used to place a blank is formed between the blank box case and the blank box inner post, and a first spring is further arranged inside the tubular inner cavity.

Further, the material-delivering apparatus includes a material-delivering slider platform fixed in the unit housing, the material-delivering slider platform is driven by a second motor, a second sliding block is slidably arranged on the material-delivering slider platform, and a material-delivering assembly is connected to the second sliding block through a material-delivering connection block.

Further, the product-collecting apparatus includes a plug-in collection frame, on which a second RFID chip is arranged, the reclaimer includes a reclaimer sliding platform fixed inside the unit housing, the reclaimer sliding platform is driven by a third motor, a third sliding block is slidably arranged on the reclaimer sliding platform, and a reclaimer assembly is connected to the third sliding block through a reclaimer connecting block.

Further, the stereoscopic production warehouse includes a goods shelf formed by steel section bars arranged horizontally and vertically, storage areas in rows are formed on the goods shelf, a roadway is formed between the storage areas, a L-shaped guiding rail is respectively provided on both sides of the bottom of the storage area, a positioning guide post and a power plug are respectively arranged on the L-shaped guiding rail, a four-direction shuttle car is slidably arranged on the L-shaped guiding rail, and a stacker is arranged at both ends of the roadway.

Further, the ex-warehouse delivery system includes an in-warehouse delivery apparatus and an out-warehouse delivery apparatus, the in-warehouse delivery apparatus includes a first product-collecting conveyor belt, a first blank box conveying belt and a first vulcanization mold conveying belt, which are arranged in parallel, one ends of the first product-collecting conveyor belt, the first blank box conveying belt and the first vulcanization mold conveying belt are provided with a main unit-in-warehouse conveyor belt, a unit relay conveyor belt is arranged inside the first vulcanization mold conveying belt, a first parallel robot is arranged at the connection of the main unit-in-warehouse conveyor belt and the first vulcanization mold conveying belt with the unit relay conveyor belt, a plurality of branch unit roadway-in-warehouse conveyor belts are arranged inside the extension end of the main unit-in-warehouse conveyor belt, the branch unit roadway-in-warehouse conveyor belts extends into the stereoscopic production warehouse, and the in-warehouse delivery apparatus and the out-warehouse delivery apparatus have an identical structure.

A production method for the 3D-configured production structure of rubber products based on an intelligent manufacturing unit, comprising the following steps:
a stage of preparing the intelligent manufacturing unit, including:
S1. the housing cover of the mobile intelligent manufacturing unit being in an open state, the box grooves of the blank feeder being positioned on the side far away from the first motor, and the material-delivering assembly of the delivering apparatus being positioned on the side close to the second motor, and the reclaimer assembly of the reclaimer being positioned on the side close to the third motor;

S2. the mobile intelligent manufacturing unit being sent to the operation area of the first parallel robot by the unit relay conveyor belt;
S3. according to production requirements, delivering the blank box loading with the corresponding blanks and having the corresponding blank information written in the the first RFID chip to the operation area of the first parallel robot through the first blank box conveying belt;
S4. according to production requirements, delivering the product-collecting apparatus having the corresponding product information written in the second RFID chip to the operation area of the first parallel robot through the first product-collecting conveyor belt;
S5. according to production requirements, delivering the selected corresponding molding vulcanization mold to the operation area of the first parallel robot through the first vulcanization mold conveying belt;
S6. the first parallel robot installing the blank box corresponding to the information, the product-collecting apparatus and the molding vulcanization mold at the designated position of the mobile intelligent manufacturing unit according to the production instruction, and closing the housing cover on the mobile intelligent manufacturing unit;
S7. the first parallel robot transferring the assembled mobile intelligent manufacturing unit to the main unit-in-warehouse conveyor belt;
S8. delivering the mobile intelligent manufacturing unit to the stacker of the stereoscopic production warehouse through the main unit-in-warehouse conveyor belt; and
S9. the mobile intelligent manufacturing unit being transferred by the stacker of the stereoscopic production warehouse and the four-direction shuttle car to an unoccupied storage area of the stereoscopic production warehouse, then positioned through the positioning guide post on the storage area, next energized through the power plug;

a stage of molding and vulcanizing rubber products, including:

S10. the material-delivering assembly of the mobile intelligent manufacturing unit being driven by the second motor and in a first operation position, at this time, keeping the lower surface of the material-delivering assembly flush with the top of the blank box case, and level with the magnetic cover at height;
S11. the lower heat plate being driven by the vulcanization cylinder to move upwards along the support post to touch the upper heat plate, the air hole channel positioned in the upper heat plate and the lower heat plate sucking air to adsorb the upper mold on the upper heat plate and the lower mold on the lower heat plate on, respectively;
S12. the lower heat plate being driven by the vulcanization cylinder to move downwards along the support post until keeping the surface of the mold cavity at the same level with the top of the blank box case;
S13. the blank box being driven by the first motor and moving in a direction close to the first motor; the lower surface of the material-delivering assembly interfering with the position of the magnetic cover, causing the magnetic cover to slide far away from the first motor until the blank box closest to the first motor is positioned right below the material-delivering assembly, at this time, no magnetic cover in the blank box, and the blank inside the blank box being still stuck in the blank box under the action of the lower surface of the material-delivering assembly, the magnetic cover of the blank box farthest from the first motor being ejected and dropping;
S14. the material-delivering assembly being driven by the second motor to move in a direction close to the second motor, until enabling the blank to be ejected by the first spring, only one blank being ejected through the structure of the material-delivering assembly;
S15. the material-delivering assembly being driven by the second motor to move in a direction of the mold, and pushing the ejected blank to the cavity of the mold, at this time, the material-delivering assembly being in a second operation position;
S16. the material-delivering assembly being driven by the second motor to move to the first operation position in a direction close to the second motor, at this time, the blank being stuck inside the blank box under the action of the lower surface of the material-delivering assembly;
S17. the lower heat plate being driven by the vulcanization cylinder to move upwards along the support post until touching the upper heat plate and applying a specified pressure on the latter through the vulcanization cylinder;
S18. the air hole channel positioned in the upper heat plate and the lower heat plate stopping sucking air, and actuating the heat pipe positioned in the upper heat plate and the lower heat plate to heat to a specified vulcanization temperature, and then starting to mold and vulcanize rubber products;
S19. after lasting for a specified time length, the air hole channel positioned in the upper heat plate and the lower heat plate sucking air, and the lower heat plate being driven by the vulcanization cylinder along the support post downwards to the position described in S12;
S20. the reclaimer assembly being driven by the third motor to move in the direction of the mold to the middle of the upper and lower cavities of the tube portion of the reclaimer assembly, and keeping the center of the tube portion coaxial with the center of the upper and lower cavities;
S21. the lower heat plate being driven by the vulcanization cylinder to move upwards along the support post, and driving the reclaimer assembly to move upwards until approaching to the upper mold;
S22. starting the air pump, and pumping rubber products in the mold cavity to the side close to the air pump;
S23. the lower heat plate being driven by the vulcanization cylinder to move downwards along the support post to the position described in S12, at this time, the reclaimer assembly returning to its original position under the action of a spring force;
S24. the reclaimer assembly being driven by the third motor to move in the direction of the third motor until exposing the gap of the reclaimer assembly from the upper surface of the material-delivering assembly, the air pump stopping operating, and rubber products falling into the product-collecting apparatus;
S25. repeating steps S14-24 until completing vulcanizing the blank in the blank box;
S26. repeating steps S13-25 until completing vulcanizing the blanks in all blank boxes;
S27. the blank box of the blank feeder, the material-delivering assembly of the material-delivering apparatus, and the reclaimer assembly of the reclaimer being positioned at the position described in S1;

S28. the lower heat plate being driven by the vulcanization cylinder to move upwards along the support post until the upper mold and the lower mold are in contact with each other, and the air hole channel in the upper heat plate and the lower heat plate stopping sucking air; and S29. the lower heat plate being driven by the vulcanization cylinder to move downwards along the support post to drive the mold to move downwards to its initial position; and a stage of delivering the intelligent manufacturing unit from storage, including:

S30. the out-warehouse delivery apparatus making delivery from the stereoscopic production warehouse.

Wherein, 1—mobile intelligent manufacturing unit; 101—unit housing; 102—PLC controller; 103—positioning hole; 104—air compressor; 105—power hole; 106—communication module; 107—housing cover; 2—molding vulcanization apparatus; 201—upper heat plate; 202—air hole channel; 203—heat pipe; 204—upper mold; 205—lower mold; 206—lower heat plate; 207—support post; 208—vulcanization cylinder; 3—blank feeder; 301—blank box; 3011—magnetic cover; 3012—blank box case; 3013—blank; 3014—blank box inner post; 3015—first spring; 302—box groove; 303—box-groove base; 304—first sliding block; 305—blank sliding platform; 306—first motor; 4—material-delivering apparatus; 401—material-delivering slider platform; 402—second sliding block; 403—second motor; 404—material-delivering connection block; 405—material-delivering assembly; 406—groove; 5—product-collecting apparatus; 6—reclaimer; 601—reclaimer assembly; 6011—reclaimer assembly front-end tube; 6012—reclaimer assembly air-pumping passage; 6013—product barrier net; 6014—product outlet; 6015—fixed sliding block; 6016—slider trough; 6017—second spring; 602—air pump; 603—reclaimer connecting block; 604—third sliding block; 605—third motor; 606—reclaimer sliding platform; 701—stacker; 702—goods shelf; 703—four-direction shuttle car; 7031—lateral guiding wheel; 7032—longitudinal guiding wheel; 7033—jack-up mechanism; 704—storage area; 705—roadway; 706—L-shaped guiding rail; 707—positioning guide post; 708—power plug; 801—main unit-in-warehouse conveyor belt; 802—branch unit roadway-in-warehouse conveyor belt; 803—first parallel robot; 804—first product-collecting conveyor belt; 805—first blank box conveying belt; 806—first vulcanization mold conveying belt; 807—unit relay conveyor belt; 808—branch unit roadway-out-warehouse conveyor belt; 809—main unit-out-warehouse conveyor belt; 810—second parallel robot; 811—second vulcanization mold conveying belt; 812—second product-collecting conveyor belt; 813—second blank box conveying belt.

DETAILED DESCRIPTION OF SOME EMBODIMENTS

Figure 1:
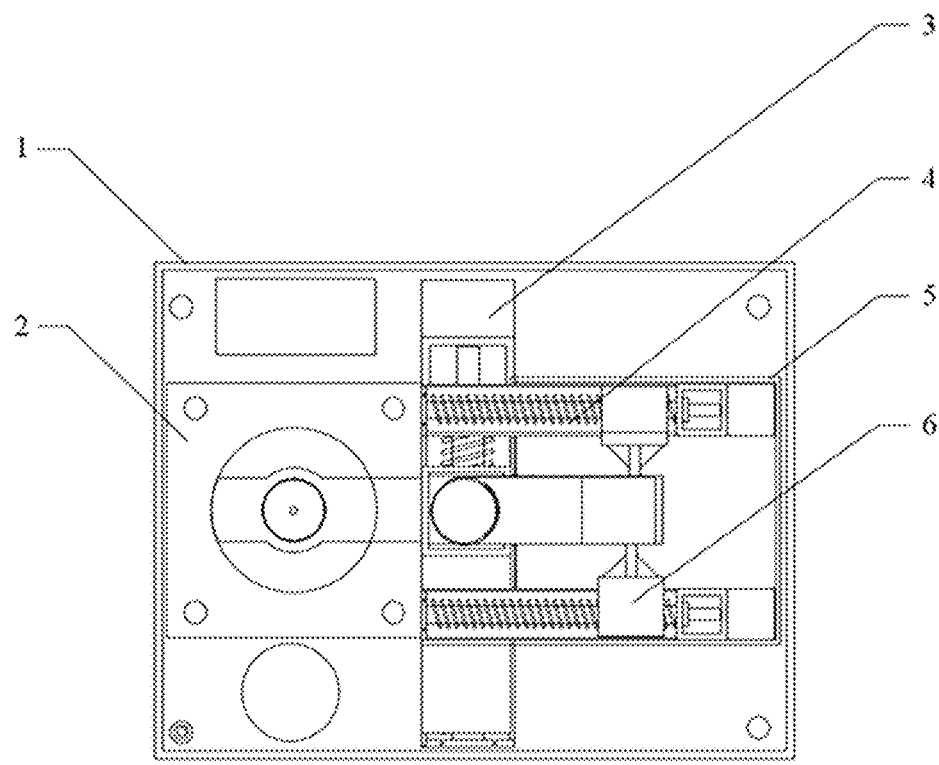
FIG. 1 is a front view of the mobile intelligent manufacturing unit of the present invention.
Figure 2:
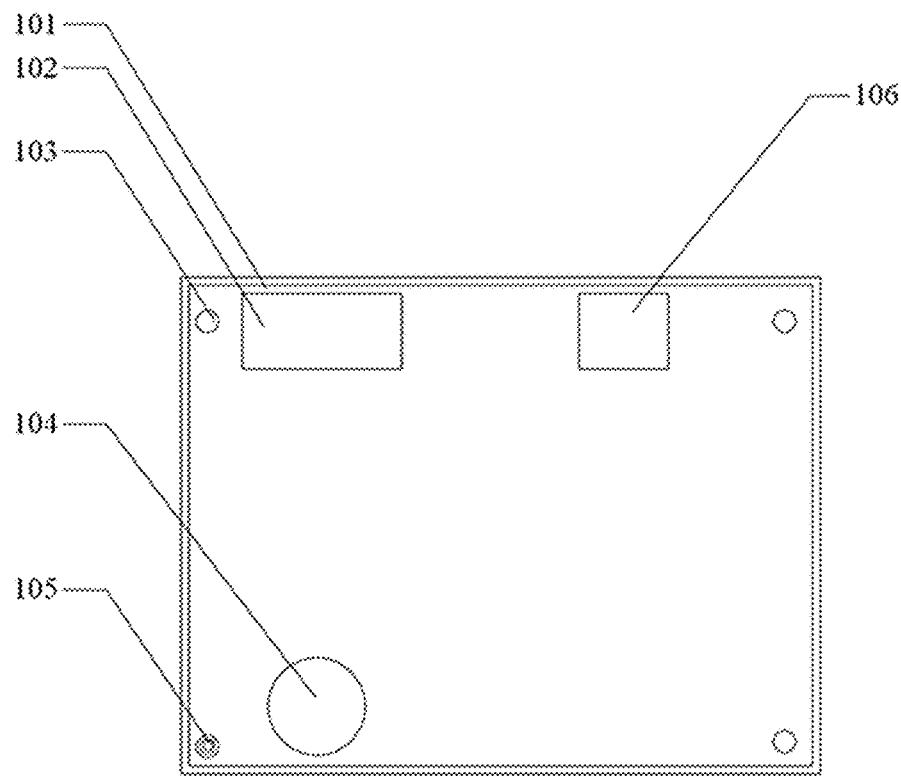
FIG. 2 is a schematic diagram of the unit housing.
Figure 3:
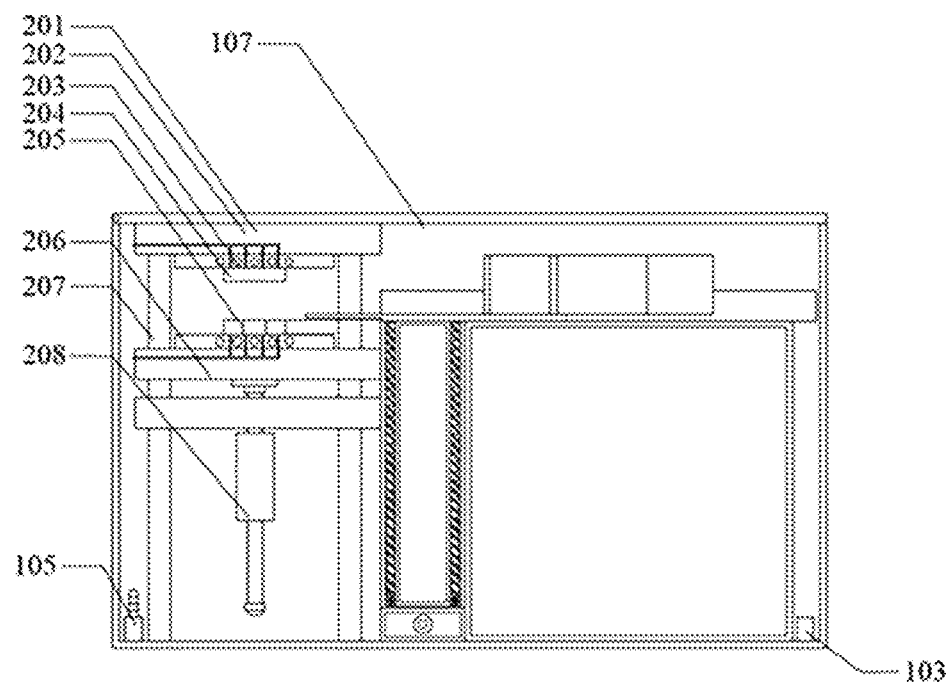
FIG. 3 is the left view of the mobile intelligent manufacturing unit.
Figure 4:
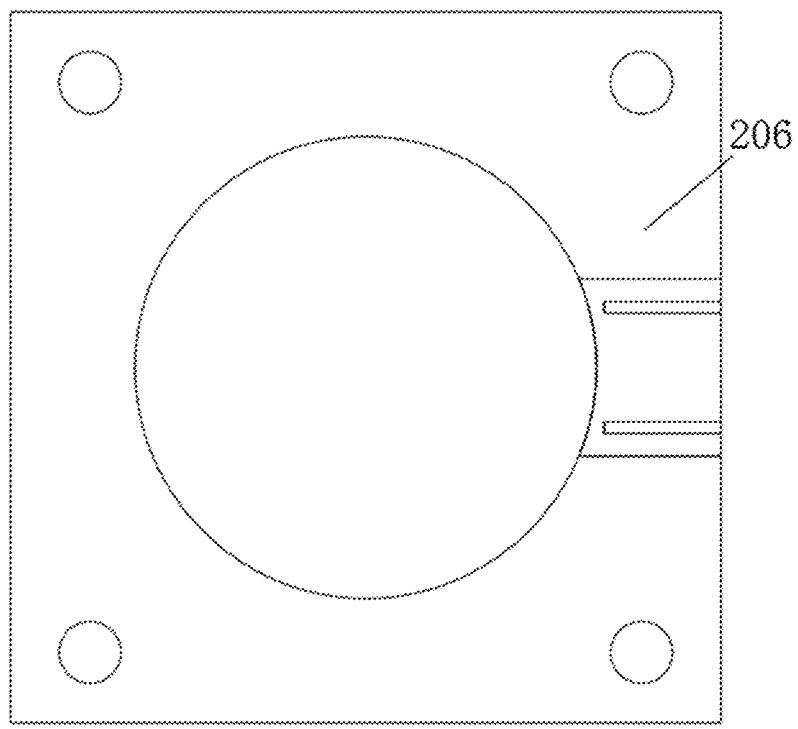
FIG. 4 is a structure diagram of the lower heat plate.
Figure 5:
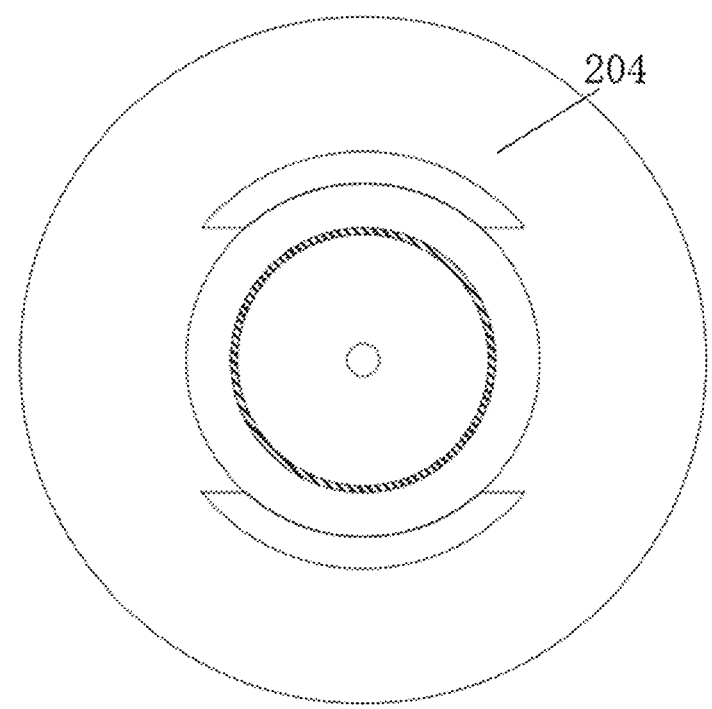
FIG. 5 is a structure diagram of the upper mold.
Figure 6:
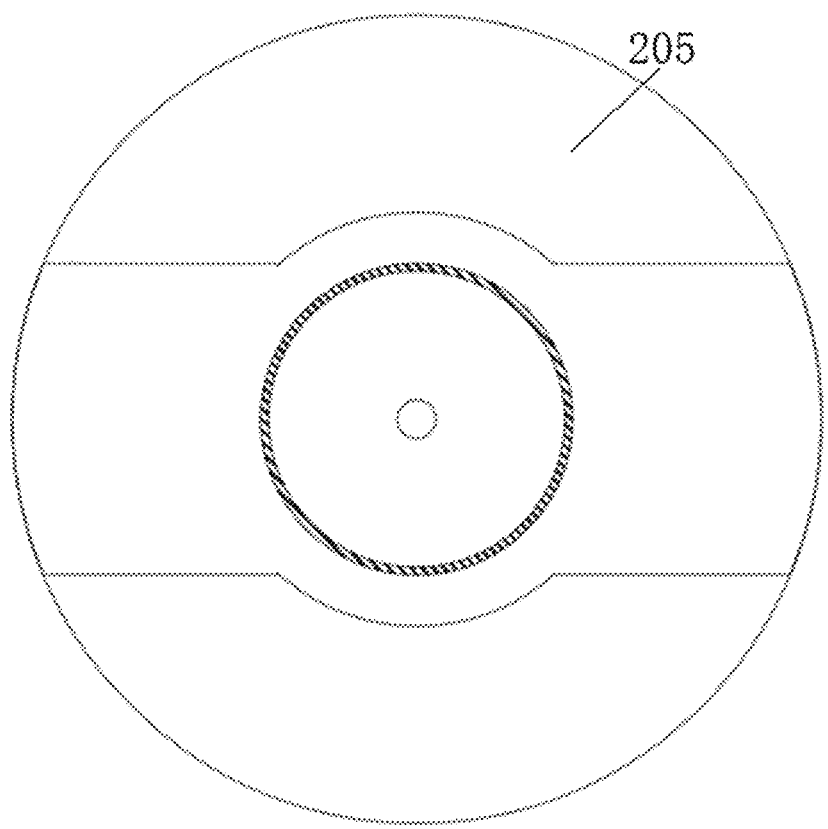
FIG. 6 is a structure diagram of the lower mold.
Figure 7:
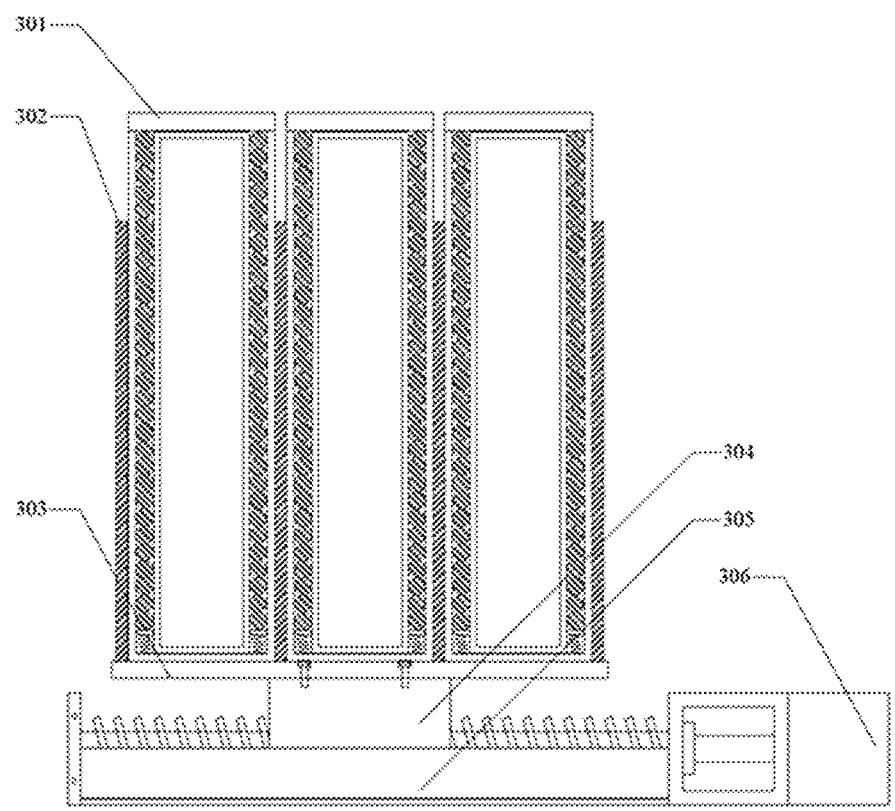
FIG. 7 is a structure diagram of the blank feeder.
Figure 8:
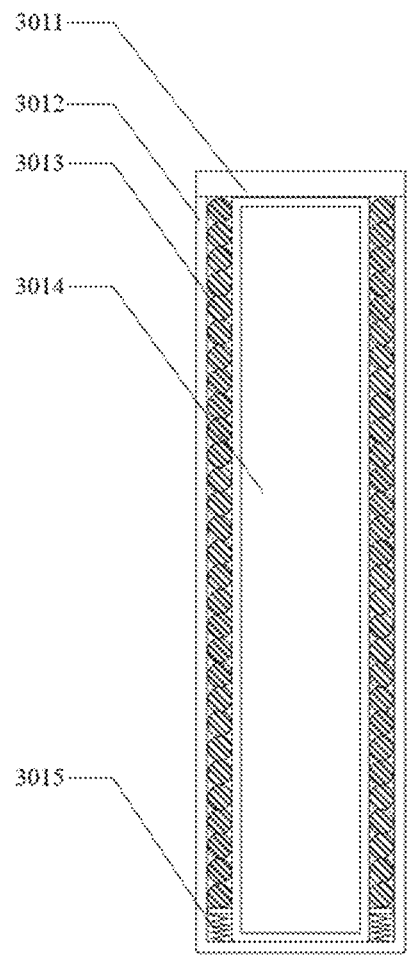
FIG. 8 is a structure diagram of the blank box.
Figure 9:
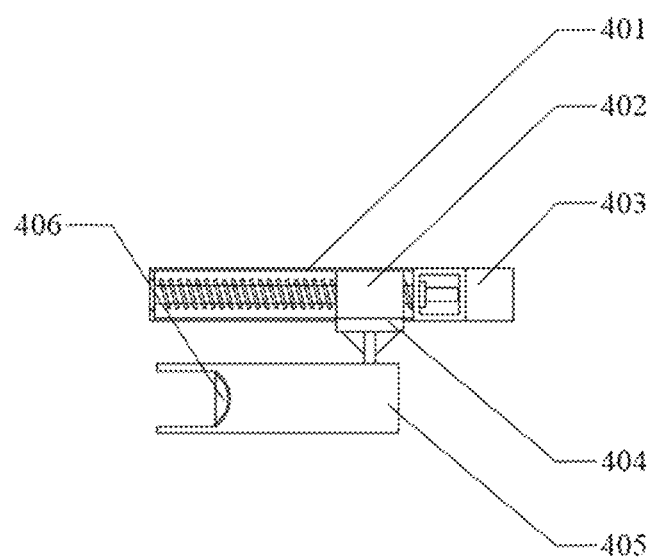
FIG. 9 is a structure diagram of the material-delivering apparatus.
Figure 10:
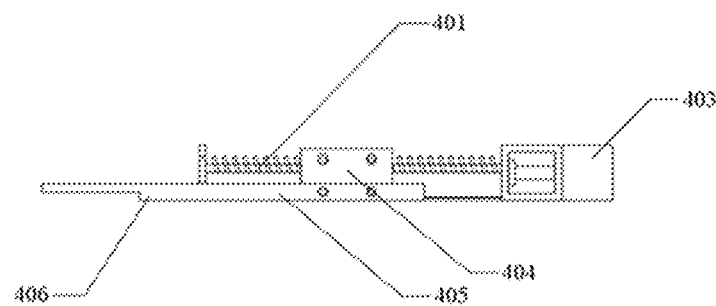
FIG. 10 is a left view of the material-delivering apparatus.
Figure 11:
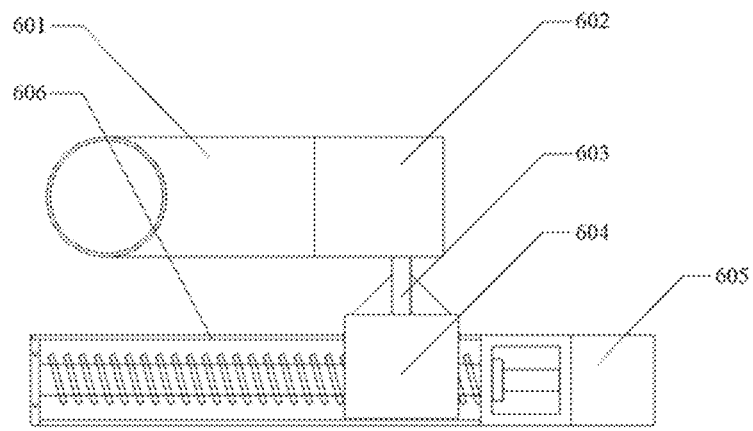
FIG. 11 is a top view of the reclaimer assembly.
Figure 12:
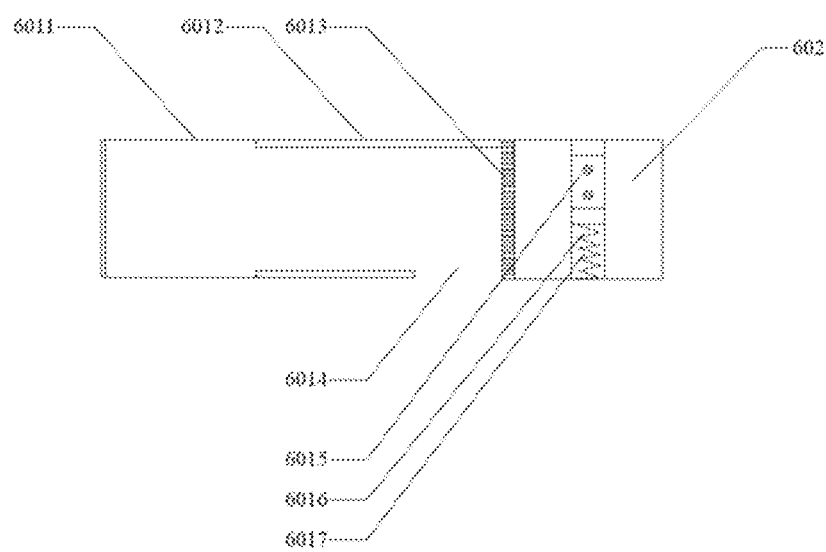
FIG. 12 is a front view of the reclaimer assembly.
Figure 13:
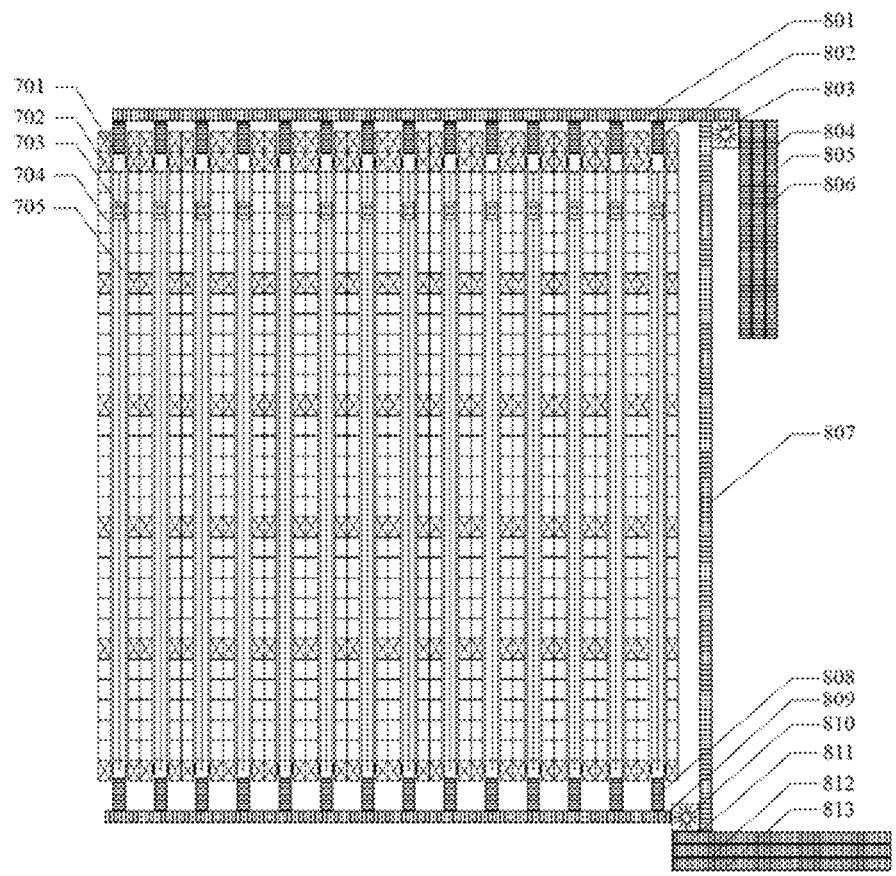
FIG. 13 is a top view of the 3D-configured production structure of the present invention.
Figure 14:
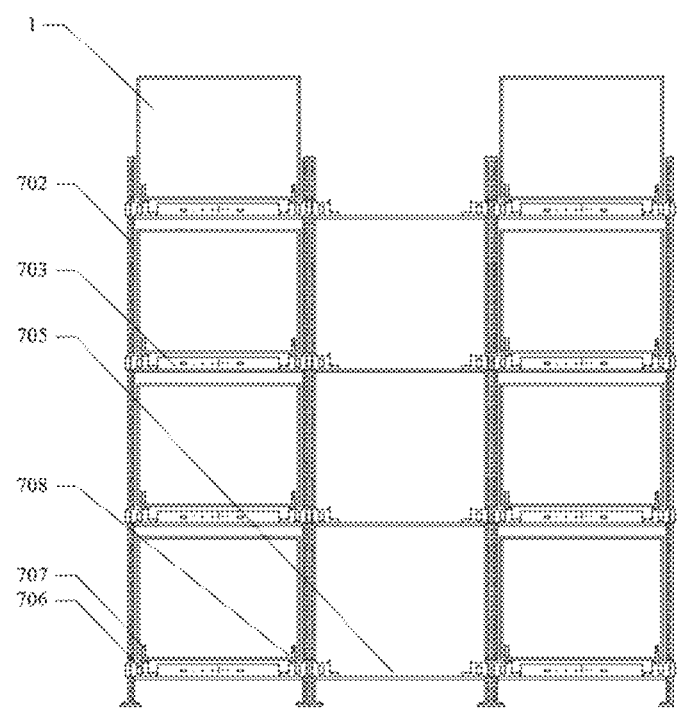
FIG. 14 is a front view of the stereoscopic production warehouse.
Figure 15:
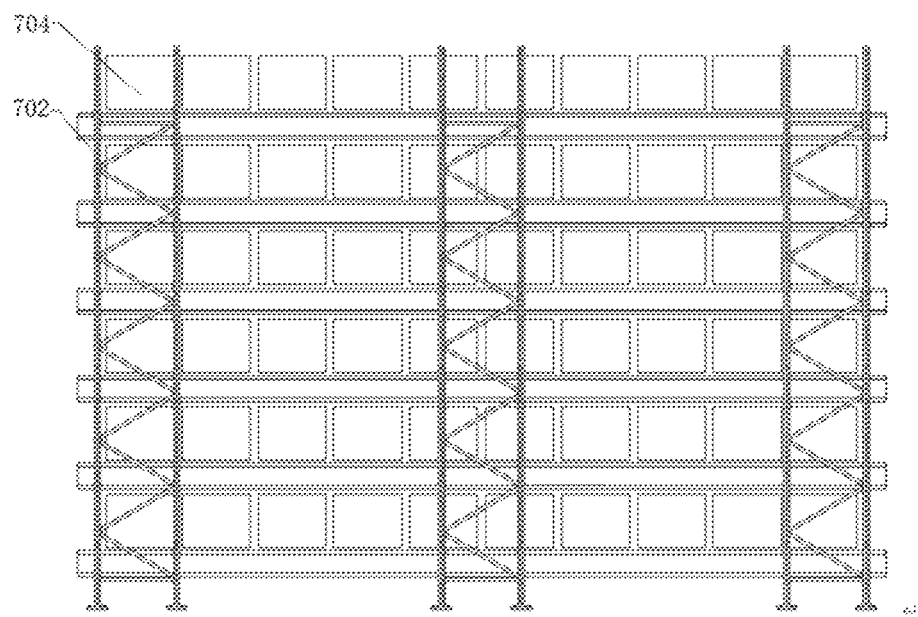
FIG. 15 is a left view of the stereoscopic production warehouse.
Figure 16:
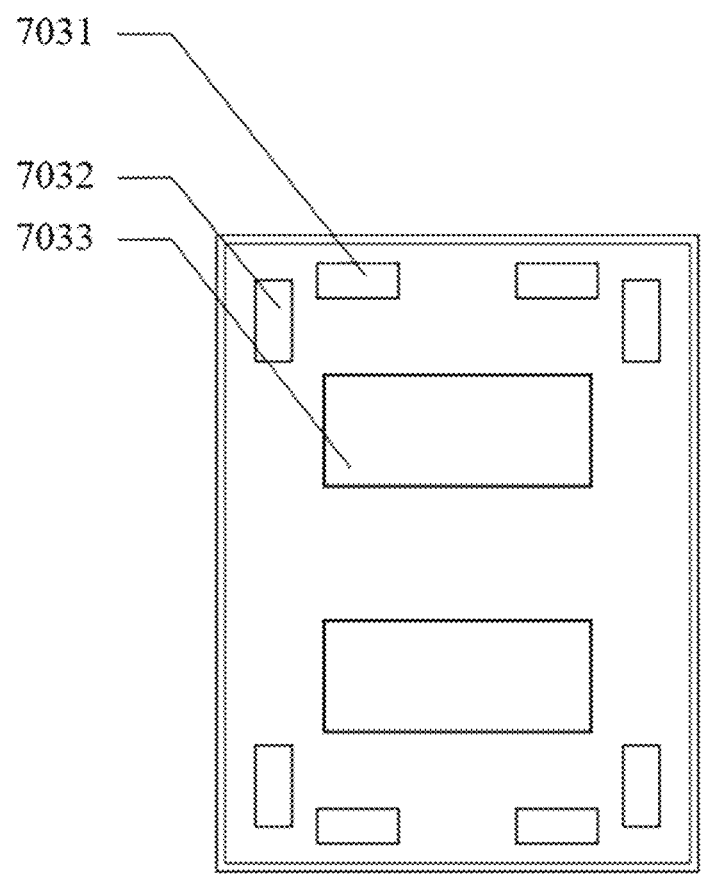
FIG. 16 is a structure diagram of the four-direction shuttle car.

In this example, as shown in FIGS.1~16, a 3D-configured production structure of rubber products based on an intelligent manufacturing unit, comprising: a stereoscopic production warehouse used to store a mobile intelligent manufacturing unit 1, and an ex-warehouse delivery system used to deliver the mobile intelligent manufacturing unit 1; wherein the mobile intelligent manufacturing unit 1 includes a unit functional assembly, a molding vulcanization apparatus 2, a blank feeder 3, a material-delivering apparatus 4, a product-collecting apparatus 5 and a reclaimer 6, the molding vulcanization apparatus 2 includes an upper heat plate 201, an upper mold 204, a lower mold 205, a lower heat plate 206 and a support post 207, the upper mold 204 and the lower mold 205 are arranged on the inner sides of the upper heat plate 201 and the lower heat plate 206, respectively, the upper heat plate 201 is fixed on one end of the support post 207, the lower heat plate 206 is arranged through the support post 207, a fixing plate is also arranged inside the support post 207, a vulcanization cylinder 208 is fixed on the lower side of the fixing plate, the output end of the vulcanization cylinder 208 is connected and fixed to the lower heat plate 206 by the fixing plate.

In this example, the support post 207 is four metal rods same with each other in structure, one end of which are fixed at the bottom of the unit housing 101, and the vulcanization cylinder 208 is fixed on the support post 207, the lower heat plate 206 is driven by the vulcanization cylinder 208 and can move up and down along the support post 207.

The middle of the lower heat plate 206 is provided with a mold mounting hole for fitting with the lower mold 205, which functions to facilitate the installation and positioning of the mold. A protuberance having the same height as the upper surface of the mold cavity of the installed lower mold 205 is arranged on one side of the mold mounting hole of the lower heat plate 206 approaching to the blank box, and the middle of the protuberance is provided with two long grooves. The protuberance functions to facilitate the material-delivering assembly 405 to push the blank 3013 into the cavity of the lower mold 205. The grooves function to prevent the upper heat plate 201, after its rise, from interfering with the fork-shaped portion on the front of the material-delivering assembly 405.

The vulcanization mold of the molding vulcanization apparatus composed of the upper mold 204 and the lower mold 205 has different cavity sizes according to various products to be produced, but has other all structures identical in size. The upper surface of the upper mold 204 and the lower surface of the lower mold 205 are smooth and flat, functioning to facilitate the adsorption of the air hole channel 202. The lower mold 205 is provided with a protuberance having the same height as the cavity, which functions to facilitate the material-delivering assembly 405 to push the blank 3013 into the cavity of the lower mold 205, and a vent hole is provided in the middle of the lower mold 205. The upper mold 204 is provided with a cavity positioning protuberance used to fit with the flat of the lower mold 205, and the middle of the upper mold 204 is provided with a vent hole, in addition, the upper mold 204 and the lower mold 205 are provided with a barcode identifier corresponding to the cavity size parameters.

This Example is further configured: the unit functional assembly includes a unit housing 101, in which a PLC controller 102, an air compressor 104 and a communication module 106 are arranged, and on which a positioning hole 103 and a power hole 105 are opened, and one side of the unit housing 101 is a detachable housing cover 107.

In this example, the molding vulcanization apparatus 2 is fixed to the bottom of the unit housing 101 and positioned at one side of the interior thereof. The blank feeder 3 is fixed to the bottom of the unit housing 101 and positioned at one side of the molding vulcanization apparatus 2. The product-collecting apparatus 5 is installed at the bottom of the unit housing 101 and positioned at one side of the blank feeder 3. The material-delivering apparatus 4 is fixed in the middle of the unit housing 101 and positioned above the blank feeder 3 and the product-collecting apparatus 5. The reclaimer 6 is fixed in the middle of the unit housing 101 and positioned above the blank feeder 3 and the product-collecting apparatus 5.

The unit housing 101 is a metal box made of aluminum alloy, the top of which is provided with a housing cover 107, and the bottom of which is provided with positioning holes 103 distributed beside three apexes of the bottom and a power hole 105 distributed beside its other apex. The positioning hole 103 fits with the positioning guide post 707, and the power hole 105 fits with the power plug 708. The upper heat plate 201 is arranged on the housing cover 107, so as to after having opened the housing cover 10, enable the first parallel robot 803 and the second parallel robot 810 to put in and take out the upper mold 204 and the lower mold 205 placed up and down. Of the power supply hole 105, the lower part has a positioning round hole, and the upper part has a power connection hole, so as to facilitate the installation of the power supply connection hole and prolonging its service life.

The PLC controller 102 controls in integration the air hole channel 202, the heat pipe 203, the vulcanization cylinder 208, the first motor 306, the second motor 403, the air pump 602 and the third motor 605 of the mobile intelligent manufacturing unit 1. The PLC controller 102 is fixed on one side wall inside the unit housing 101, powered through the power hole 105, and controls the mobile intelligent manufacturing unit 1 to perform automatically molding and vulcanizing rubber products according to a preset program.

The air compressor 104 is fixed on the bottom of the unit housing 101 and powered through the power hole 105, and the compressed air provided by the air compressor 104 is fed to the vulcanization cylinder 208.

The communication module 106 is fixed on one side wall inside the unit housing 101, and powered through the power hole 105. The communication module 106 is used to interact with the production system by means of data interchange, including but not limited to startup and stop the automatic production process.

This Example is further configured: the middle of the upper heat plate 201 is provided with a heat pipe 203 used to provide heat and an air hole channel 202 used to provide force to adsorb a mold.

In this example, the air hole channel 202 is composed of a main channel, and a plurality of sub-channels opening to the surface of the heat plate and functioning to enable the upper and lower molds to make use of the air pressure difference to absorb the mold by means of the air suction of the air hole channel 202, after touching the upper and lower heat plates respectively. The heat pipes 203 are evenly distributed inside the upper and lower heat plates, and function to achieve the purpose of providing the rubber blank with the vulcanization temperature by taking electricity from the power hole 105 and then heating themselves.

This Example is further configured: the blank feeder 3 includes a blank sliding platform 305 driven by a first motor 306, a first sliding block 304 is slidably arranged on the blank sliding platform 305, a box-groove base 303 is fixed on the first sliding block 304, a plurality of box grooves 302 are formed inside the box-groove base 303, a blank box 301 is placed in the box groove 302, and a first RFID chip is arranged inside the blank box 301.

This Example is further configured: the blank box 301 includes a blank box case 3012, the open end of which is fixed with a magnetic cover 3011, and in which a blank box inner post 3014 is arranged, a tubular inner cavity used to place a blank 3013 is formed between the blank box case 3012 and the blank box inner post 3014, and a first spring 3015 is further arranged inside the tubular inner cavity, to fix the blank sliding platform 305 on the bottom of the unit housing 101. The first sliding block 304 is driven by the first motor 306 to move back and forth in the length direction of the blank sliding platform 305. The first motor 306 is powered through the power hole 105 and controlled by the PLC controller 102.

In this example, the blank box 301 has a cuboid blank box case 3012. After the blank box 301 is installed, the top of the blank box case 3012 is at the same height as the flat of the lower mold 205, so as to facilitate the material-delivering assembly 405 to push the blank 3013 into the cavity of the lower mold 205. When filling the blank box 301, the blank 3013 are pressed into the blank box 301 from its top one by one until it is full with the blank 3013. After the blank box 301 is full with the blank 3013, the top of the blank box 301 is covered with a magnetic cover 3011 functioning to compress the blank 3013 tightly. In order to increase the production capacity of the mobile intelligent manufacturing unit 1 and reduce the frequency in and out of the stereoscopic production warehouse, the mobile intelligent manufacturing unit 1 is filled with multiple blank boxes 301 at a time.

This example is further configured: the material-delivering apparatus 4 includes a material-delivering slider platform 401 fixed in the unit housing 101, the material-delivering slider platform 401 is driven by a second motor 403, a second sliding block 402 is slidably arranged on the material-delivering slider platform 401, and a material-delivering assembly 405 is connected to the second sliding block 402 through a material-delivering connection block 404.

In this example, one end of the material-delivering assembly 405 in the longitudinal direction is connected to the material-delivering connection block 404, and the other end is fork-shaped. The distance between the two heads of the fork-shaped portion is smaller than the diameter of the blank, and fits with the groove of the protuberance of the lower mold 205. The material-delivering assembly 405 is provided with the groove 406 in its thickness direction and at the lower part of the fork-shaped portion, and the thickness of the groove 406 is equivalent to the thickness of the single blank 3013. The material-delivering assembly 405 has the upper surface co-operating with the reclaimer assembly 601, and the lower surface co-operating with the blank box housing 3012. The operation principle of the material-delivering assembly 405 is as follows. 1. When the box groove 302 is moved from the blank sliding platform 305 to the operating position, the material-delivering assembly 405 moves toward the second motor 403 until the blank 3013 is ejected from the box groove 302 under the function of the first spring 3015. 2. Due to the effect from the fork-shaped portion, only one piece of the blank 3013 will be ejected from the box groove 302. 3. The material-delivering assembly 405 moves in the direction of the lower mold 205, and the groove 406 pushes the blank 3013 to move toward the lower mold 205 until the blank 3013 are pushed into the cavity of the lower mold 205. 4. The material-delivering assembly 405 moves toward the second motor 403 until the fork-shaped portion has no interference due to the upward movement of the lower heating plate 206, meanwhile the lower surface of the material-delivering assembly 405 is positioned above the blank box housing 3012, so as to ensure that the blank 3013 will not be ejected out of the blank box 301.

This example is further configured: the product-collecting apparatus 5 includes a plug-in collection frame, on which a second RFID chip is arranged, the reclaimer 6 includes a reclaimer sliding platform 606 fixed inside the unit housing 101, the reclaimer sliding platform 606 is driven by a third motor 605, a third sliding block 604 is slidably arranged on the reclaimer sliding platform 606, and a reclaimer assembly 601 is connected to the third sliding block 604 through a reclaimer connecting block 603.

In this example, the front part of the reclaimer assembly 601 is provided with the reclaimer assembly front-end tube 6011, which is an irregular component penetrating from top to bottom and having an opening side wall. Of the reclaimer assembly air-pumping passage 6012, one end is connected to the side wall opening of the reclaimer assembly front-end tube 6011, and the other end is connected to the air pump 602. The product barrier net 6013 is also arranged between the air-pumping channel 6012 and the air pump 602, functioning to prevent the products from being pumped into the air pump 602. The inner and outer diameters of the reclaimer assembly front-end tube 6011 fit with the cavity of the vulcanization mold, so as to ensure that the air pump 602 can extract products from the cavity of the mold. One side of the reclaimer assembly air-pumping passage 6012 approaching to the air pump 602 is provided with the product outlet 6014, which is used for the product to drop into the product-collecting apparatus 5 form the air pump 602 during no operation of the latter. The size of the reclaimer assembly air-pumping passage 6012 is larger than the size of the product.

The reclaimer assembly 601 is connected with the reclaimer connecting block 603 through the fixed sliding block 6015, and the reclaimer connecting block 603 is connected with the third sliding block 604. The fixed sliding block 6015 moves up and down along the slider trough 6016, and positioned with the assistance of the second spring 6017, functioning to co-operating with the upper heating plate 206 to ensure that the reclaimer assembly front-end tube 6011 forms a closed space together with the upper mold 204 and the lower mold 205. The reclaimer assembly 601 is driven by the third motor 605 to move back and forth along the reclaimer sliding platform 606, which is fixed in the middle of the unit housing 101 and positioned above the blank feeder 3 and the product-collecting apparatus 5. The third motor 605 is powered through the power hole 105 and controlled by the PLC controller 102.

The operation principle of the reclaimer assembly 601 is as follows. 1. After finishing the molding and vulcanization of products, the lower heating plate 206 moves down until the cavity of the lower mold 205 is level with the blank box housing 3012, and the reclaimer assembly 601 moves toward the lower mold 205 until the reclaimer assembly front-end tube 6011 are coaxial with the cavities of the upper mold 204 and the lower mold 205. 2. The lower heat plate 206 moves upwards to drive the reclaimer assembly 601 to move upwards until the reclaimer assembly front-end tube 6011 forms a closed space together with the upper mold 204, the lower mold 205 and the upper surface of the material-delivering assembly 405. 3. The air pump 602 operates to suck out the product in the cavity of the upper mold 204 or the lower mold 205 until it sucks on the product barrier net 6013. 4. The lower heat plate 206 moves downwards, the reclaimer assembly 601 is reset under the action of the second spring 6017, and driven by the third motor 605 to move toward the side of the product-collecting apparatus 5 until the product outlet 6014 leaves the upper surface of the material-delivering assembly 405 and is exposed above the product-collecting apparatus 5. 5. The air pump 602 stops operating, and the products fall into the product-collecting apparatus 5 under the action of gravity. The air pump 602 adopts an existing suction pump or extraction pump, and its structure will not be repeated here.

This example is further configured: the stereoscopic production warehouse includes a goods shelf 702 formed by steel section bars arranged horizontally and vertically, storage areas in rows are formed on the goods shelf 702, a roadway 705 is formed between the storage areas 704, a L-shaped guiding rail 706 is respectively provided on both sides of the bottom of the storage area 704, a positioning guide post 707 and a power plug 708 are respectively arranged on the L-shaped guiding rail 706, a four-direction shuttle car 703 is slidably arranged on the L-shaped guiding rail 706, and a stacker 701 is arranged at both ends of the roadway 705.

In this example, the goods shelf 702 is fixed on the ground, and reinforcing section bars at a certain angle are arranged between each section bar to improve the load-bearing capacity of the stereoscopic warehouse. The stacker 701 adopts the prior art, and its structure will not be repeated here.

The four-direction shuttle car 703 is a flat mobile jack-up apparatus composed of the lateral guiding wheel 7031, the longitudinal guiding wheel 7032 and the jack-up mechanism 7033. Its operating steps includes: (1) after the four-direction shuttle car 703 runs into the stacker 701 and is positioned below the mobile intelligent manufacturing unit 1, pushing up the jack-up mechanism 7033 of the four-direction shuttle car 703, and jacking up the mobile intelligent manufacturing unit 1; (2) moving the four-direction shuttle car 703 and the mobile intelligent manufacturing unit 1 to the designated appropriate area of the storage area 704 of the stereoscopic production warehouse by means of the lateral guiding wheel 703 land the longitudinal guiding wheel 7032, which are both driven by a motor or a steering engine; and (3) resetting jack-up mechanism so that the mobile intelligent manufacturing unit 1 falls, and the positioning hole 103 on the mobile intelligent manufacturing unit 1 fits with the positioning guide post 707, and the power hole 105 fits with the power plug 708, so as to effect positioning and powering. The jack-up mechanism 7033 adopts the prior art, and its specific structure is not repeated here.

The stacker 701 is arranged at both ends of the roadway 705, functioning to co-operate with the four-direction shuttle car 703 to move the mobile intelligent manufacturing unit 1 to the designated position of the stereoscopic production warehouse or out of the stereoscopic production warehouse.

This example is further configured: the ex-warehouse delivery system includes an in-warehouse delivery apparatus and an out-warehouse delivery apparatus, the in-warehouse delivery apparatus includes a first product-collecting conveyor belt 804, a first blank box conveying belt 805 and a first vulcanization mold conveying belt 806, which are arranged in parallel, one ends of the first product-collecting conveyor belt 804, the first blank box conveying belt 805 and the first vulcanization mold conveying belt 806 are provided with a main unit-in-warehouse conveyor belt 801, a unit relay conveyor belt 807 is arranged inside the first vulcanization mold conveying belt 806, a first parallel robot 803 is arranged at the connection of the main unit-in-warehouse conveyor belt 801 and the first vulcanization mold conveying belt 806 with the unit relay conveyor belt 807, a plurality of branch unit roadway-in-warehouse conveyor belts 802 are arranged inside the extension end of the main unit-in-warehouse conveyor belt 801, the branch unit roadway-in-warehouse conveyor belts 802 extends into the stereoscopic production warehouse, and the in-warehouse delivery apparatus and the out-warehouse delivery apparatus have an identical structure.

In this example, one end of the main unit-in-warehouse conveyor belt 801 is connected to the first parallel robot 803 and is connected to a plurality of branch unit roadway-in-warehouse conveyor belts 802, functioning to move the mobile intelligent manufacturing unit 1 transferred from the first parallel robot 803 to the designated stacker 701, and then press and vulcanize the blank 3013 transferred from the stereoscopic production warehouse to the storage area 704.

The out-warehouse delivery apparatus includes the branch unit roadway-out-warehouse conveyor belt 808, the main unit-out-warehouse conveyor belt 809, the second parallel robot 810, the second vulcanization mold conveying belt 811, the second product-collecting conveyor belt 812 and the second blank box conveying belt 813.

The branch unit roadway-out-warehouse conveyor belt 808 is used to convey the mobile intelligent manufacturing unit 1 sent from the stereoscopic production warehouse to the main unit-out-warehouse conveyor belt 809, and then the mobile intelligent manufacturing unit 1 is delivered to the second parallel robot 810 by the main unit-out-warehouse conveyor belt 809.

The second parallel robot 810 functions to take out the blank box 301, the vulcanization mold, and the product-collecting apparatus 5 from the mobile intelligent manufacturing unit 1, and place them on the second blank box conveying belt 813, the second vulcanization mold conveying belt 811 and the second product-collecting conveyor belt 812, respectively. The blank box 301, the vulcanization mold, and the product-collecting apparatus 5 are conveyed to the next process area by the second blank box conveying belt 813, the second vulcanization mold conveying belt 811 and the product-collecting conveyor belt 812, respectively. The mobile intelligent manufacturing unit 1 that has completed sorting parts is transferred to the unit relay conveyor belt 807 by the parallel second robot 810.

The above-mentioned parallel robot is a multi-axis manipulator, which adopts the prior art, and its structure is not repeated here.

A production method for the 3D-configured production structure of rubber products based on an intelligent manufacturing unit, comprising the following steps:

a stage of preparing the intelligent manufacturing unit, including:
S1. the housing cover 107 of the mobile intelligent manufacturing unit 1 being in an open state, the box grooves 302 of the blank feeder 3 being positioned on the side far away from the first motor 306, and the material-delivering assembly 405 of the delivering apparatus 4 being positioned on the side close to the second motor 403, and the reclaimer assembly 601 of the reclaimer 6 being positioned on the side close to the third motor 605;
S2. the mobile intelligent manufacturing unit 1 being sent to the operation area of the first parallel robot 803 by the unit relay conveyor belt 807;
S3. according to production requirements, delivering the blank box 301 loading with the corresponding blanks 3013 and having the corresponding blank information written in the the first RFID chip to the operation area of the first parallel robot 803 through the first blank box conveying belt 805;
S4. according to production requirements, delivering the product-collecting apparatus 5 having the corresponding product information written in the second RFID chip to the operation area of the first parallel robot 803 through the first product-collecting conveyor belt 804;
S5. according to production requirements, delivering the selected corresponding molding vulcanization mold to the operation area of the first parallel robot 803 through the first vulcanization mold conveying belt 804;
S6. the first parallel robot 803 installing the blank box 301 corresponding to the information, the product-collecting apparatus 5 and the molding vulcanization mold at the designated position of the mobile intelligent manufacturing unit 1 according to the production instruction, and closing the housing cover 107 on the mobile intelligent manufacturing unit 1;
S7. the first parallel robot 803 transferring the assembled mobile intelligent manufacturing unit 1 to the main unit-in-warehouse conveyor belt 801;
S8. delivering the mobile intelligent manufacturing unit 1 to the stacker 701 of the stereoscopic production warehouse through the main unit-in-warehouse conveyor belt 801; and
S9. the mobile intelligent manufacturing unit 1 being transferred by the stacker 701 of the stereoscopic production warehouse and the four-direction shuttle car 703 to an unoccupied storage area 704 of the stereoscopic production warehouse, then positioned through the positioning guide post 707 on the storage area 704, next energized through the power plug 708;

a stage of molding and vulcanizing rubber products, including:
S10. the material-delivering assembly 405 of the mobile intelligent manufacturing unit 1 being driven by the second motor 403 and in a first operation position, at this time, keeping the lower surface of the material-delivering assembly 405 flush with the top of the blank box case 3012, and level with the magnetic cover 3011 at height;
S11. the lower heat plate 206 being driven by the vulcanization cylinder 208 to move upwards along the support post 207 to touch the upper heat plate 201, the air hole channel 202 positioned in the upper heat plate 201 and the lower heat plate 206 sucking air to adsorb the upper mold 204 on the upper heat plate 201 and the lower mold 204 on the lower heat plate 206 on, respectively;

S12. the lower heat plate 206 being driven by the vulcanization cylinder 208 to move downwards along the support post 207 until keeping the surface of the mold cavity at the same level with the top of the blank box case 3012;

S13. the blank box 301 being driven by the first motor 306 and moving in a direction close to the first motor 306; the lower surface of the material-delivering assembly 405 interfering with the position of the magnetic cover 3011, causing the magnetic cover 3011 to slide far away from the first motor 306 until the blank box 301 closest to the first motor 306 is positioned right below the material-delivering assembly 405, at this time, no magnetic cover 3011 in the blank box 301, and the blank 3013 inside the blank box 301 being still stuck in the blank box 301 under the action of the lower surface of the material-delivering assembly 405, the magnetic cover 3011 of the blank box 301 farthest from the first motor 306 being ejected and dropping;

S14. the material-delivering assembly 405 being driven by the second motor 403 to move in a direction close to the second motor 403, until enabling the blank 3013 to be ejected by the first spring 3015, only one blank 3013 being ejected through the structure of the material-delivering assembly 405;

S15. the material-delivering assembly 405 being driven by the second motor 403 to move in a direction of the mold, and pushing the ejected blank 3013 to the cavity of the mold, at this time, the material-delivering assembly 405 being in a second operation position;

S16. the material-delivering assembly 405 being driven by the second motor 403 to move to the first operation position in a direction close to the second motor 403, at this time, the blank 3013 being stuck inside the blank box 301 under the action of the lower surface of the material-delivering assembly 405;

S17. the lower heat plate 206 being driven by the vulcanization cylinder 208 to move upwards along the support post 207 until touching the upper heat plate 201 and applying a specified pressure on the latter through the vulcanization cylinder 208;

S18. the air hole channel 202 positioned in the upper heat plate 201 and the lower heat plate 206 stopping sucking air, and actuating the heat pipe 203 positioned in the upper heat plate 201 and the lower heat plate 206 to heat to a specified vulcanization temperature, and then starting to mold and vulcanize rubber products;

S19. after lasting for a specified time length, the air hole channel 206 positioned in the upper heat plate 201 and the lower heat plate 206 sucking air, and the lower heat plate 206 being driven by the vulcanization cylinder 208 along the support post 207 downwards to the position described in S12;

S20. the reclaimer assembly 601 being driven by the third motor 605 to move in the direction of the mold to the middle of the upper and lower cavities of the tube portion of the reclaimer assembly 601, and keeping the center of the tube portion coaxial with the center of the upper and lower cavities;

S21. the lower heat plate 206 being driven by the vulcanization cylinder 208 to move upwards along the support post 207, and driving the reclaimer assembly 601 to move upwards until approaching to the upper mold 204;

S22. starting the air pump, and pumping rubber products in the mold cavity to the side close to the air pump;

S23. the lower heat plate 206 being driven by the vulcanization cylinder 208 to move downwards along the support post 207 to the position described in S12, at this time, the reclaimer assembly 601 returning to its original position under the action of a spring force;

S24. the reclaimer assembly 601 being driven by the third motor 605 to move in the direction of the third motor 605 until exposing the gap of the reclaimer assembly 601 from the upper surface of the material-delivering assembly 405, the air pump stopping operating, and rubber products falling into the product-collecting apparatus 5;

S25. repeating steps S14-24 until completing vulcanizing the blank 3013 in the blank box 301;

S26. repeating steps S13-25 until completing vulcanizing the blanks 3013 in all blank boxes 301;

S27. the blank box 301 of the blank feeder 3, the material-delivering assembly 405 of the material-delivering apparatus 4, and the reclaimer assembly 601 of the reclaimer 6 being positioned at the position described in S1;

S28. the lower heat plate 206 being driven by the vulcanization cylinder 208 to move upwards along the support post 207 until the upper mold 204 and the lower mold 205 are in contact with each other, and the air hole channel 202 in the upper heat plate 201 and the lower heat plate 206 stopping sucking air; and S29. the lower heat plate 206 being driven by the vulcanization cylinder 208 to move downwards along the support post 207 to drive the mold to move downwards to its initial position; and a stage of delivering the intelligent manufacturing unit from storage, including:

S30. the out-warehouse delivery apparatus making delivery from the stereoscopic production warehouse.

The S30 specifically includes the following steps:

S301. the intelligent manufacturing unit 1 that has completed molding and vulcanization being transferred by the four-direction shuttle car 703 and the stacker 701 in the stereoscopic production warehouse to the main unit-out-warehouse conveyor belt 809;

S302. the intelligent manufacturing unit 1 being delivered to the operation area of the second parallel robot 810 by the main unit-out-warehouse conveyor belt 809;

S303, the second parallel machine 810 opening the unit housing 101 of the intelligent manufacturing unit 1, taking out the vulcanization mold, the blank box 301 and the product-collecting apparatus 5 and placing them on the second vulcanization mold conveying belt 811, the second blank box conveying belt 813 and the second product-collecting conveyor belt 812;

S304. the intelligent manufacturing unit 1 being transferred by the second parallel robot 810 to the unit relay conveyor belt 807 as a standby; and S305. repeating steps S1~S30.

What is claimed is:

1. A 3D-configured production structure of rubber products based on an intelligent manufacturing unit, comprising:
a production warehouse used to store a mobile intelligent manufacturing unit; and
an ex-warehouse delivery system used to deliver said mobile intelligent manufacturing unit,
wherein said mobile intelligent manufacturing unit includes a unit functional assembly, a molding vulcanization apparatus, a blank feeder, a material-delivering apparatus, a product-collecting apparatus and a reclaimer, said molding vulcanization apparatus includes an upper heat plate, an upper mold, a lower mold, a lower heat plate and a support post, said upper mold and said lower mold are arranged on the inner sides of said upper heat plate and said lower heat plate, respectively, said upper heat plate is fixed on one end of said support post, said lower heat plate is slidably arranged on said support post and driven to move along the support post, a fixing plate is also arranged inside said support post, a vulcanization cylinder is fixed on the lower side of said fixing plate, the output end of said vulcanization cylinder is connected and fixed to said lower heat plate by said fixing plate and drives the lower heat plate to move up and down along the support post.

2. The 3D-configured production structure of rubber products based on an intelligent manufacturing unit according to claim 1, wherein said unit functional assembly includes a unit housing, in which a PLC controller, an air compressor and a communication module are arranged, and on which a positioning hole and a power hole are opened, and one side of said unit housing is a detachable housing cover.

3. The 3D-configured production structure of rubber products based on an intelligent manufacturing unit according to claim 2, wherein said material-delivering apparatus includes a material-delivering slider platform fixed in said unit housing, said material-delivering slider platform is driven by a motor, a sliding block is slidably arranged on said material-delivering slider platform, and a material-delivering assembly is connected to the sliding block through a material-delivering connection block.

4. The 3D-configured production structure of rubber products based on an intelligent manufacturing unit according to claim 2, wherein said product-collecting apparatus includes a plug-in collection frame, on which an RFID chip is arranged, said reclaimer includes a reclaimer sliding platform fixed inside said unit housing, said reclaimer sliding platform is driven by a motor, a sliding block is slidably arranged on said reclaimer sliding platform, and a reclaimer assembly is connected to the third sliding block through a reclaimer connection block.

5. The 3D-configured production structure of rubber products based on an intelligent manufacturing unit according to claim 1, wherein the middle of said upper heat plate is provided with a heat pipe used to provide heat and an air hole channel used to provide force to adsorb a mold.

6. The 3D-configured production structure of rubber products based on an intelligent manufacturing unit according to claim 1, wherein said blank feeder includes a blank sliding platform driven by a motor, a sliding block is slidably arranged on said blank sliding platform, a box-groove base is fixed on said sliding block, a plurality of box grooves are formed inside said box-groove base, a blank box is placed in said box groove, and an RFID chip is arranged inside said blank box.

7. The 3D-configured production structure of rubber products based on an intelligent manufacturing unit according to claim 6, wherein said blank box includes a blank box case, the open end of which is fixed with a magnetic cover, and in which a blank box inner post is arranged, a tubular inner cavity used to place a blank is formed between said blank box case and said blank box inner post, and a first spring is further arranged inside said tubular inner cavity.

8. The 3D-configured production structure of rubber products based on an intelligent manufacturing unit according to claim 1, wherein said production warehouse includes a goods shelf formed by steel section bars arranged horizontally and vertically, storage areas in rows are formed on said goods shelf, a roadway is formed between said storage areas, a L-shaped guiding rail is respectively provided on both sides of the bottom of said storage areas, a positioning guide post and a power plug are respectively arranged on said L-shaped guiding rail, a four-direction shuttle car is slidably arranged on said L-shaped guiding rail, and a stacker is arranged at both ends of said roadway.

9. The 3D-configured production structure of rubber products based on an intelligent manufacturing unit according to claim 1, wherein said ex-warehouse delivery system includes an in-warehouse delivery apparatus and an out-warehouse delivery apparatus, said in-warehouse delivery apparatus includes a first product-collecting conveyor belt, a first blank box conveying belt and a first vulcanization mold conveying belt, which are arranged in parallel, one ends of said first product-collecting conveyor belt, said first blank box conveying belt and said first vulcanization mold conveying belt are provided with a main unit-in-warehouse conveyor belt, a unit relay conveyor belt is arranged inside said first vulcanization mold conveying belt, a first parallel robot is arranged at the connection of said main unit-in-warehouse conveyor belt and said first vulcanization mold conveying belt with said unit relay conveyor belt, a plurality of branch unit roadway-in-warehouse conveyor belts are arranged inside the extension end of said main unit-in-warehouse conveyor belt, said branch unit roadway-in-warehouse conveyor belts extends into said production warehouse, and said in-warehouse delivery apparatus and said out-warehouse delivery apparatus have an identical structure.

* * * * *